United States Patent
Chewter et al.

(10) Patent No.: US 12,330,475 B2
(45) Date of Patent: Jun. 17, 2025

(54) VEHICLE MICROCLIMATE PERSONALIZATION BASED ON OCCUPANT THERMOPHYSIOLOGY

(71) Applicant: GENTHERM INCORPORATED, Novi, MI (US)

(72) Inventors: Alan Chewter, Ypsilanti, MI (US); Chad Westerman, Milford, MI (US); Tyler Myers, Plymouth, MI (US); Jeremy Swanson, Ypsilanti, MI (US); Jun Yang, Windsor (CA); Vladimir Jovovic, Pasadena, CA (US)

(73) Assignee: Gentherm Incorporated, Novi, MI (US)

( * ) Notice: Subject to any disclaimer, the term of this patent is extended or adjusted under 35 U.S.C. 154(b) by 275 days.

(21) Appl. No.: 17/792,898

(22) PCT Filed: Feb. 5, 2021

(86) PCT No.: PCT/US2021/016743
§ 371 (c)(1),
(2) Date: Jul. 14, 2022

(87) PCT Pub. No.: WO2021/158867
PCT Pub. Date: Aug. 12, 2021

(65) Prior Publication Data
US 2023/0063435 A1    Mar. 2, 2023

Related U.S. Application Data

(60) Provisional application No. 62/970,430, filed on Feb. 5, 2020.

(51) Int. Cl.
*B60H 1/00* (2006.01)
*B60N 2/56* (2006.01)
*B62D 1/06* (2006.01)

(52) U.S. Cl.
CPC .......... *B60H 1/00742* (2013.01); *B60N 2/56* (2013.01); *B62D 1/065* (2013.01)

(58) Field of Classification Search
CPC .............. B60H 1/00742; B60H 1/2218; B60H 2001/2265; B60H 1/2225; B60H 1/2227; B60H 1/00878; B60N 2/56; B62D 1/065
See application file for complete search history.

(56) References Cited

U.S. PATENT DOCUMENTS

2004/0164171 A1 * 8/2004 Eisenhour .......... B60H 1/00064
236/91 C
2015/0093981 A1    4/2015 Fusco et al.
(Continued)

FOREIGN PATENT DOCUMENTS

DE    102013214555    1/2015
DE    102014209247 B4 * 6/2021 ......... B60H 1/00735
(Continued)

OTHER PUBLICATIONS

Machine translated description of the Bader et al. (DE 102014209247) reference. (Year: 2014).*

(Continued)

*Primary Examiner* — Navid Z. Mehdizadeh
*Assistant Examiner* — Shelley Marie Osterhout
(74) *Attorney, Agent, or Firm* — Carlson, Gaskey & Olds, P.C.

(57) ABSTRACT

A method of providing thermal conditioning for a vehicle occupant according to an example of the present disclosure includes determining a respective target temperature for each of a plurality of discrete OPZs. Each OPZ is associated with a different occupant body area. The determining is based on a difference between a first OTS indicative of a target heat flux for the occupant and a second OTS indicative of an estimated heat flux experienced by the occupant, (Continued)

wherein the respective target temperatures differ between the OPZs. The method includes providing thermal conditioning in each OPZ based on the target temperature for the OPZ, which includes utilizing at least one thermal effector in the OPZ. The method also includes receiving a temperature offset value for a particular one of the OPZs from the occupant, and adjusting the target temperature for the particular one of the OPZs based on the temperature offset value.

21 Claims, 12 Drawing Sheets

(56) References Cited

U.S. PATENT DOCUMENTS

| | | | |
|---|---|---|---|
| 2016/0129817 A1 | 5/2016 | Shimizu et al. | |
| 2018/0208017 A1* | 7/2018 | Hernandez | B60K 35/00 |
| 2018/0345753 A1* | 12/2018 | Beloe | B60H 1/00742 |
| 2021/0008960 A1* | 1/2021 | Saitou | B60H 1/00207 |
| 2021/0102722 A1* | 4/2021 | Nabi | F24F 11/46 |

FOREIGN PATENT DOCUMENTS

| | | | |
|---|---|---|---|
| FR | 3040658 | 3/2017 | |
| JP | 2019182403 | 10/2019 | |
| WO | 2016070052 | 5/2016 | |
| WO | WO-2016070052 A1 * | 5/2016 | ......... B60H 1/00285 |
| WO | 2017173222 | 10/2017 | |

OTHER PUBLICATIONS

International Preliminary Report on Patentability for International Patent Application No. PCT/US2021/016743 dated Aug. 18, 2022.
International Search Report for International Patent Application No. PCT/US2021/016743 dated May 7, 2021.

* cited by examiner

VEHICLE MICROCLIMATE PERSONALIZATION BASED ON OCCUPANT THERMOPHYSIOLOGY

CROSS REFERENCE TO RELATED APPLICATIONS

This application claims priority to U.S. Provisional Application No. 62/970,430 filed on Feb. 5, 2020, which is incorporated by reference herein in its entirety.

BACKGROUND

This application relates to thermal conditioning in a vehicle cabin, and more particularly to providing for personalized thermal conditioning in a plurality of different occupant personalization zones in a vehicle cabin.

Providing thermal conditioning for a vehicle occupant presents many challenges. One of those challenges is that people experience thermal comfort differently depending on a variety of factors, such as gender, weight, and clothing. Thus, two occupants in the same vehicle cabin may have differing and conflicting expectations from a vehicle thermal conditioning system.

SUMMARY

A method of providing thermal conditioning for an occupant of a vehicle according to an example of the present disclosure includes determining a respective target temperature for each of a plurality of discrete occupant personalization zones (OPZs). Each OPZ is associated with a different occupant body area, and the determining is based on a difference between a first overall thermal sensation (OTS) indicative of a target heat flux for the occupant and a second OTS indicative of an estimated heat flux experienced by the occupant, wherein the respective target temperatures differ between the OPZs. The method includes providing thermal conditioning in each OPZ based on the target temperature for the OPZ, and that providing includes utilizing at least one thermal effector in the OPZ. The method includes receiving a temperature offset value for a particular one of the OPZs from the occupant, and adjusting the target temperature for the particular one of the OPZs based on the temperature offset value.

In a further embodiment of any of the foregoing embodiments, the method includes receiving a disable command from the occupant for one or more of the OPZs, and based on receiving the disable command, disabling said one or more of the OPZs based on the disable command or resetting the temperature offset for the particular one of the OPZs based on the disable command.

In a further embodiment of any of the foregoing embodiments, the method includes determining a temperature in each OPZ, and for each OPZ said providing of thermal conditioning in the OPZ includes adjusting an output of the at least one thermal effector in the OPZ to reduce a difference between the determined temperature and the target temperature for the OPZ.

In a further embodiment of any of the foregoing embodiments, said providing thermal conditioning in each OPZ includes heating the occupant with a first thermal effector in a first one of the OPZs based on the target temperature for the first OPZ being below the determined temperature of the first OPZ, and cooling the occupant with a second thermal effector in a second one of the OPZs based on the target temperature for the second OPZ being above the determined temperature of the second OPZ, wherein said heating and cooling are performed simultaneously.

In a further embodiment of any of the foregoing embodiments, said providing thermal conditioning in each OPZ includes determining a ranking of each of the thermal effectors, and determining a temperature setpoint for each OPZ further based on the relative ranking of each thermal effector in the OPZ.

In a further embodiment of any of the foregoing embodiments, said determining a respective target temperature for each OPZ includes determining at least one predefined thermal conditioning range for each effector in each OPZ that has a maximum temperature and a minimum temperature, determining a default temperature for the OPZ that is within the predefined thermal conditioning range based on the maximum and minimum temperatures, and adjusting the default temperature based on the difference between the first and OTS second OTS to obtain the target temperature.

In a further embodiment of any of the foregoing embodiments, the at least one predefined thermal conditioning range also includes a maximum airflow rate and a minimum airflow rate.

In a further embodiment of any of the foregoing embodiments, the predefined thermal conditioning ranges differ between the OPZs and the thermal effectors in each OPZ.

In a further embodiment of any of the foregoing embodiments, said adjusting the default temperature based on the difference between the first and second OTS to obtain the target temperature includes determining a nominal temperature setpoint based on the difference between the first OTS and second OTS, default temperature, and a magnitude of the predefined thermal conditioning range. The default temperature is increased by a value derived from the nominal temperature setpoint based on the first OTS being greater than the second OTS, and the default temperature is decreased by the value derived from the nominal temperature setpoint based on the first OTS being less than the second OTS.

In a further embodiment of any of the foregoing embodiments, the default temperature is a mean of the maximum and minimum temperatures.

In a further embodiment of any of the foregoing embodiments, the method includes comparing the adjusted target temperature to at least one of a maximum permissible target temperature for the OPZ and a minimum permissible target temperature for the OPZ, and reducing the temperature offset based on the adjusted target temperature exceeding the maximum permissible target temperature for the OPZ or falling below the minimum permissible target temperature for the OPZ.

In a further embodiment of any of the foregoing embodiments, the plurality of OPZs include at least three of a head zone, a seat back zone, a seat cushion zone, a hand/arm zone, and a foot/leg zone.

In a further embodiment of any of the foregoing embodiments, the thermal effectors for the plurality of OPZs have at least three of a climate controlled seat, a neck conditioner mounted in the head rest or upper seat back, a climate controlled headliner, a heated steering wheel, a heated gear shifter, a heated door panel, a heater mat, convective thermal effector, and a mini-compressor system.

In a further embodiment of any of the foregoing embodiments, at least one of the thermal effectors is a convective thermal effector that has a fan, and the method includes determining a default fan speed for the fan, and adjusting the default fan speed based on receiving a fan speed offset from the occupant.

In a further embodiment of any of the foregoing embodiments, the method includes determining a heat balance for the occupant, and determining the first OTS based on the heat balance.

In a further embodiment of any of the foregoing embodiments, the method includes iteratively repeating said determining, providing, and adjusting for a plurality of iterations while utilizing the same temperature offset value during each of the plurality of iterations.

A thermal conditioning system according to an example of the present disclosure includes a plurality of thermal effectors arranged into a plurality of discrete occupant personalization zones (OPZs) that are each associated with a different part of an occupant body area, such that each OPZ includes at least one of the thermal effectors. A controller is configured to determine a respective target temperature for each OPZ based on a difference between a first overall thermal sensation (OTS) indicative of a target heat flux for the occupant and a second OTS indicative of an estimated heat flux currently experienced by the occupant, wherein the respective target temperatures differ between the OPZs. The controller is configured to control at least one thermal effector in each OPZ based on the target temperature for the OPZ, receive a temperature offset value for a particular one of the OPZs from the occupant, and adjust the target temperature for the particular one of the OPZs based on the temperature offset value.

In a further embodiment of any of the foregoing embodiments, the controller is configured to reset the temperature offset for the particular one of the OPZs based on the occupant disabling the at least one thermal effector in the particular one of the OPZs.

In a further embodiment of any of the foregoing embodiments, to determine the respective target temperature for each OPZ, the controller is configured to determine a predefined thermal conditioning range for the OPZ that includes a maximum temperature and a minimum temperature, wherein the predefined thermal conditioning ranges may differ between the OPZs. The controller is configured to determine a default temperature for the OPZ that is within the predefined thermal conditioning range based on the maximum and minimum temperatures, and adjust the default temperature based on the difference between the first and second OTS to obtain the target temperature.

In a further embodiment of any of the foregoing embodiments, to adjust the default temperature based on the difference between the first and second OTS to obtain the target temperature, the controller is configured to determine a nominal temperature setpoint based on the difference between the first OTS and second OTS, default temperature, and a magnitude of the predefined thermal conditioning range. The controller is configured to increase the default temperature by a value derived from the nominal temperature setpoint based on first OTS being greater than the second OTS, and decrease the default temperature by the value derived nominal temperature setpoint based on the first OTS being less than the second OTS.

In a further embodiment of any of the foregoing embodiments, the controller is configured to determine a temperature in each OPZ, and to control the at least one thermal effector in each OPZ based on the target temperature for the OPZ, the controller is configured to adjust an output of the at least one thermal effector in the OPZ to reduce a difference between the determined temperature and the target temperature for the OPZ.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIGS. 4A-C are portions of a combined diagram illustrating an example arrangement for determining the OTS of a vehicle occupant.

DETAILED DESCRIPTION

The present disclosure describes a thermal conditioning system for a vehicle cabin that includes an HVAC system and a microclimate thermal conditioning system (MTCS). The MTCS includes a plurality of microclimate thermal effectors operable to provide thermal conditioning in a plurality of discrete occupant personalization zones (OPZs) in the vehicle cabin (e.g., head, seat back, seat cushion, hands/arm, and foot/leg). Temperature setpoints for the microclimate thermal effectors are determined based on an overall thermal sensation (OTS) determined for the vehicle occupant in conjunction with an occupant profile of temperature ranges most preferred by the vehicle occupant and defined for each body segment. The OTS is based on the heat flux delivered to the vehicle occupant from the environment, as well as a calculation of the vehicle occupant's metabolic state. The OTS indicates the overall thermal sensation experienced by the vehicle occupant. A default occupant profile is provided for the MTCS that indicates possible temperature and heat flow scenarios that provide maximum thermal comfort to a typical vehicle occupant. The vehicle occupant profile is customizable in some embodiments, e.g., to indicate specifics of a particular occupant, such as weight, gender, and clothing, as each of these effects how an occupant experiences thermal comfort. The thermal conditioning system 10 enables vehicle occupants to enter temperature and flow rate offsets for various ones of the OPZs to improve their thermal comfort.

Figure 1:
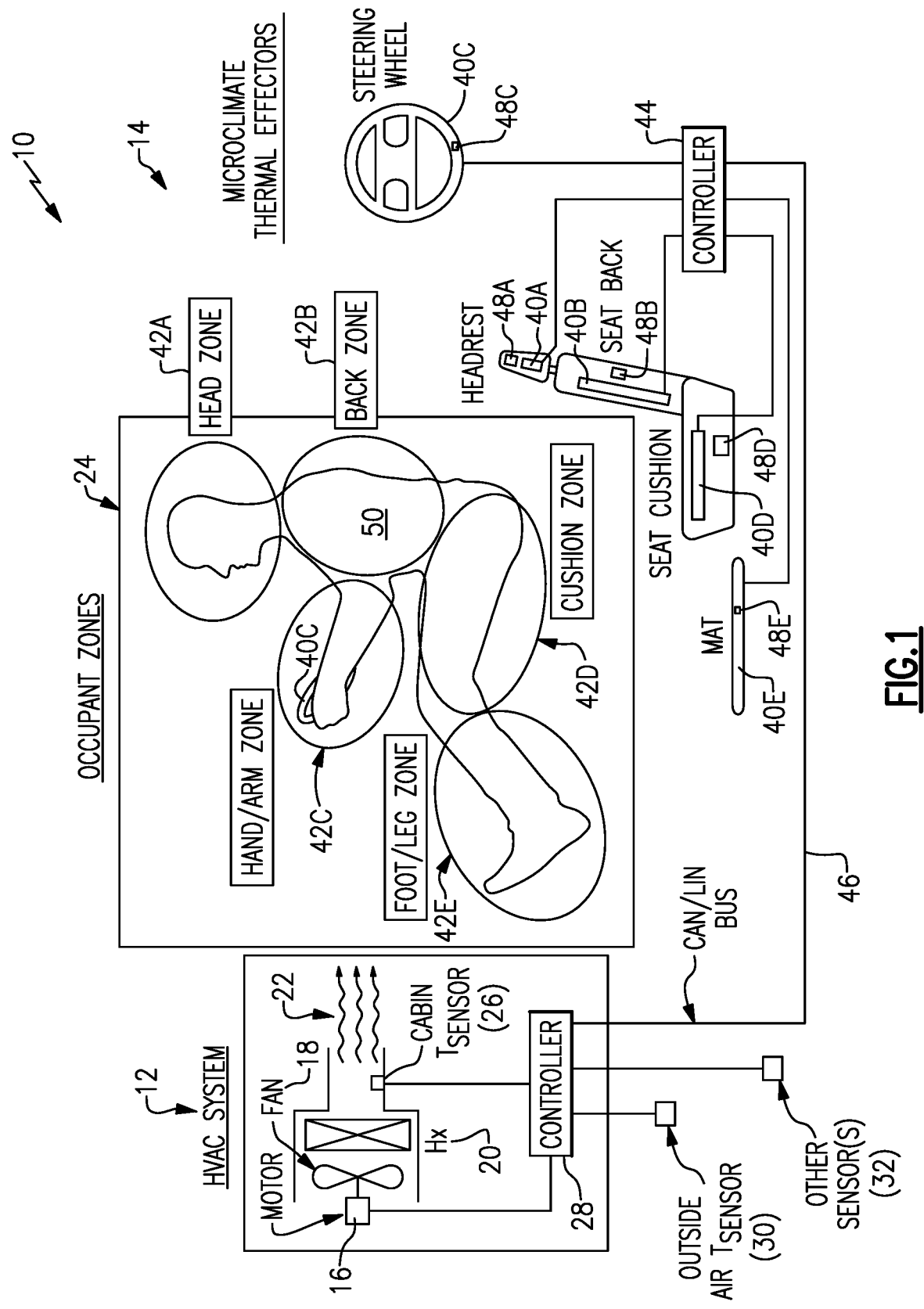
FIG. 1 schematically illustrates a thermal conditioning system that includes an HVAC system and a microclimate thermal conditioning system.

FIG. 1 schematically illustrates a thermal conditioning system 10 that includes an HVAC system 12 and a microclimate thermal conditioning system (MTCS) 14. The HVAC system 12 includes a motor 16 that drives a fan 18 which passes air through a heat exchanger 20 to provide thermally conditioned air 22 within vehicle cabin 24. A cabin temperature sensor 26 provides temperature information to a HVAC controller 28 that is operable to adjust operation of the motor 16 based on temperature readings from the cabin temperature sensor 26. The HVAC controller 28 may also receive information from an outside air temperature sensor 30 and one or more additional sensors 32, for example.

The HVAC controller 28 regulates operation of the HVAC system 12 to a temperature set point that is typically manually adjusted by the vehicle occupant. The central HVAC system 12 is insufficient to achieve thermal comfort for each specific occupant and location in many scenarios, so the MTCS 14 is provided to create a unique microclimate for each occupant in the vehicle cabin 24, thereby providing improved overall occupant thermal comfort.

Each occupant of a vehicle typically has unique personal comfort preferences. That is, a particular occupant detects a level of thermal energy differently than another occupant. As a result, the exact same thermal environment within a vehicle may be perceived as comfortable by one occupant, but as uncomfortable by another occupant. To this end, this disclosure provides for occupants to make manual adjustments that control both the central HVAC 12 system and the MTCS 14 in an optimal and coordinated fashion.

There are numerous sources of heating and cooling within a vehicle that impact the vehicle occupant's thermal comfort. In one example, the various heating and cooling sources can be represented by an equivalent homogeneous temperature (EHT) within the cabin. EHT represents the total thermal effects on an occupant as a measure of the vehicle occupant's heat loss, which produces a whole body thermal sensation. EHT takes into account the combined convective, conductive and radiative effects on the vehicle occupant and combines these effects into a single value, which is especially useful for modelling non-uniform thermal environments. One example calculation of EHT can be found in Han, Taeyoung and Huang, Linjie, "A Model for Relating a Thermal Comfort Scale to EHT Comfort Index," SAE Technical Paper 2004-01-0919, 2004. As explained in this SAE paper, which is incorporated by reference in its entirety, the modeled thermal environment is affected by "breath level" air temperature, mean radiant temperature (MRT), air velocity, solar load and relative humidity.

The HVAC system of a vehicle conditions the bulk air within the cabin to achieve a cabin temperature. Other environmental influences on the microclimate environment include vehicle ambient temperature and solar load on the vehicle. One example of using EHT to achieve occupant thermal comfort is described in U.S. Provisional Application No. 62/951,289, entitled "AUTOMATIC SEAT THERMAL COMFORT CONTROL SYSTEM AND METHOD", filed on Dec. 20, 2019, which is incorporated by reference in its entirety.

An occupant's thermal condition, can be expressed using the Berkeley Sensation and Comfort Scale ("Berkeley scale"), described in, for example, Arens E. A., Zhang H. & Huizenga C. (2006) Partial—and whole-body thermal sensation and comfort, Part I: Uniform environmental conditions. *Journal of Thermal Biology*, 31, 53-59. The Berkley scale numerically represents thermal sensation as: −4 very cold, −3 cold, −2 cool, −1 slightly cool, 0 neutral, 1 slightly warm, 2 warm, 3 hot, 4 very hot. It should be understood that other approaches can be used to quantify an occupant's thermal condition. Overall thermal sensation (OTS) is a measure of the thermal sensation experienced by a particular occupant based upon the heat transfer rates to their body. Each level of the Berkley scale is indicative of a difference between a current heat flux of the user and a desired heat flux of the user.

The MTCS 14 may have many discrete occupant microclimate zones, or Occupant Personalization Zones (OPZs). According to ISO 145045-2:2006 (E), a human body can be divided into different body segments, such as hand, head or chest, and each segment may have a different thermal comfort temperature range. The five example zones in FIG. 1 are head, back, cushion (thigh and buttocks), foot/leg, and arm/hand. Fewer, more and/or different zones may be used if desired.

Referring still to FIG. 1, the MTCS 14 includes a plurality of discrete microclimate thermal effectors 40A-E which are each disposed in a respective OPZ 42A-E. In the example of FIG. 1, the OPZs 42 includes a head zone 42A, a back zone 42B, a hand/arm zone 42C, a cushion zone 42D, and a foot/leg zone 42E. A variety of the OPZs 42A-E and could be used in different vehicles. In one example, at least three of the head zone 42A, back zone 42B, hand/arm zone 42C, seat cushion zone 42D, and foot/leg zone 42E are provided.

Each OPZ 42 provides a microclimate for a specific zone in contact with a particular vehicle occupant. An example vehicle occupant 50 shown in FIG. 1 is a driver that has access to a steering wheel. Other vehicle occupants would likely not have a steering wheel, but could still have other devices that effect the climate in that zone, for example heated and cooled surfaces, radiant heating panels, HVAC vents, sun loads etc. For each of the OPZs shown 42A-E the software is configured to account thermodynamically for all of the methods of heat transfer that effect that zone, both controlled effectors including HVAC and uncontrolled loads such as radiation from the sun. The climate in that zone is then controlled according to the actual state of the climate in that zone compared with the desired state of the climate in that zone. Although only a single microclimate thermal effector 40 is shown in each OPZ 42, it is understood that multiple thermal effectors 40 could be included in a particular OPZ 42.

A variety of thermal effectors 40 could be used in each OPZ, such as resistive electrical heaters, thermoelectric devices which use Peltier effect to provide for heating or cooling, convective thermal conditioning devices which provide for air flow (e.g., air flow from within the vehicle seat to the OPZ 42), etc. Some example thermal effectors that could be used in the system 10 include, but are not limited to, for example, climate controlled seats (see, e.g., U.S. Pat. Nos. 5,524,439 and 6,857,697), a neck conditioner mounted in a head rest or upper seat back (see, e.g., U.S. Provisional App. No. 62/039,125), a climate controlled headliner (see, e.g., U.S. Provisional App. No. 61/900,334), a climate controlled (e.g., heated) door panel and/or instrument panel, a heated controlled steering wheel (see, e.g., U.S. Pat. No. 6,727,467 and U.S. Pub. No. 2014/0090513), a heated gear shifter (see, e.g., U.S. Pub. No. 2013/0061603, etc.), an intelligent microthermal module or "iMTM" (see, e.g., International Application No. WO202011290), heater mats (which may be installed in seat and other surfaces surrounding or in contact with the vehicle occupant 50), a mini-compressor system configured to deliver a thermal effect to the vehicle occupant 50 by convective heat transfer from cooled and conditioned air (see, e.g., International Application No. WO2018049159A1), and/or a convective thermal effector capable of heating or cooling located in the seat back or cushion to achieve a personalized microclimate.

In one example, at least three of the following thermal effectors 40 are provided: a climate controlled seat, a neck conditioner mounted in the read rest or upper seat back, a climate controlled headliner, a heated steering wheel, a heated gear shifter, a climate controlled door panel, a heater mat, a mini-compressor system, and a convective thermal effector.

The microclimate system provides desired occupant personal comfort in an automated manner with little or no input being required from the vehicle occupant. All or some of these devices can be arranged to optimally control the thermal environment around an occupant of a seat located anywhere inside a passenger vehicle. In addition, these components can be used to regulate thermal comfort separately for individual segments or personalization zones of the vehicle occupant's body.

A controller 44 controls each of the thermal effectors 40. The controller 44 is in communication with the HVAC system controller 28 through a communication bus 46 which may include a control area network (CAN) bus and/or a local interconnect network (LIN) bus, for example. The controller 44 is also in communication with a plurality of distributed cabin temperature sensors 48A-D disposed in one or more of the OPZs 42. Although five local temperature sensors 48A-E are shown in FIG. 1, it is understood that other quantities of OPZ temperature sensors 48 could be used (e.g., fewer or more than five OPZ temperature sensors). Partitioning the body into zones has two purposes. First, the human body and its local environment can be modelled so that the overall heat transfer rate to the body can be determined. This is used to assess the current state of thermal comfort for each occupant in the vehicle. The higher the number of segments, the more accurate the thermal model can be. The ideal number of zones for the accuracy of the thermodynamic model may be limited by the number of sensors available in current vehicle cabins. Secondly, the vehicle occupant may prefer to differentiate the thermal environment around their body according to the specific zone, such as head, feet, etc. Even with sensing limitations, the optimal number of thermodynamic zones may exceed the number preferred for personalization and control by the vehicle occupant. In fact, occupants generally prefer a more limited number of zones when considering preferences. Therefore, the control software resolves an accurate thermodynamic multi zone model used for estimation, into a smaller number of occupant personalization zones in order to provide automatic control and personalization at the same time.

Figure 2:
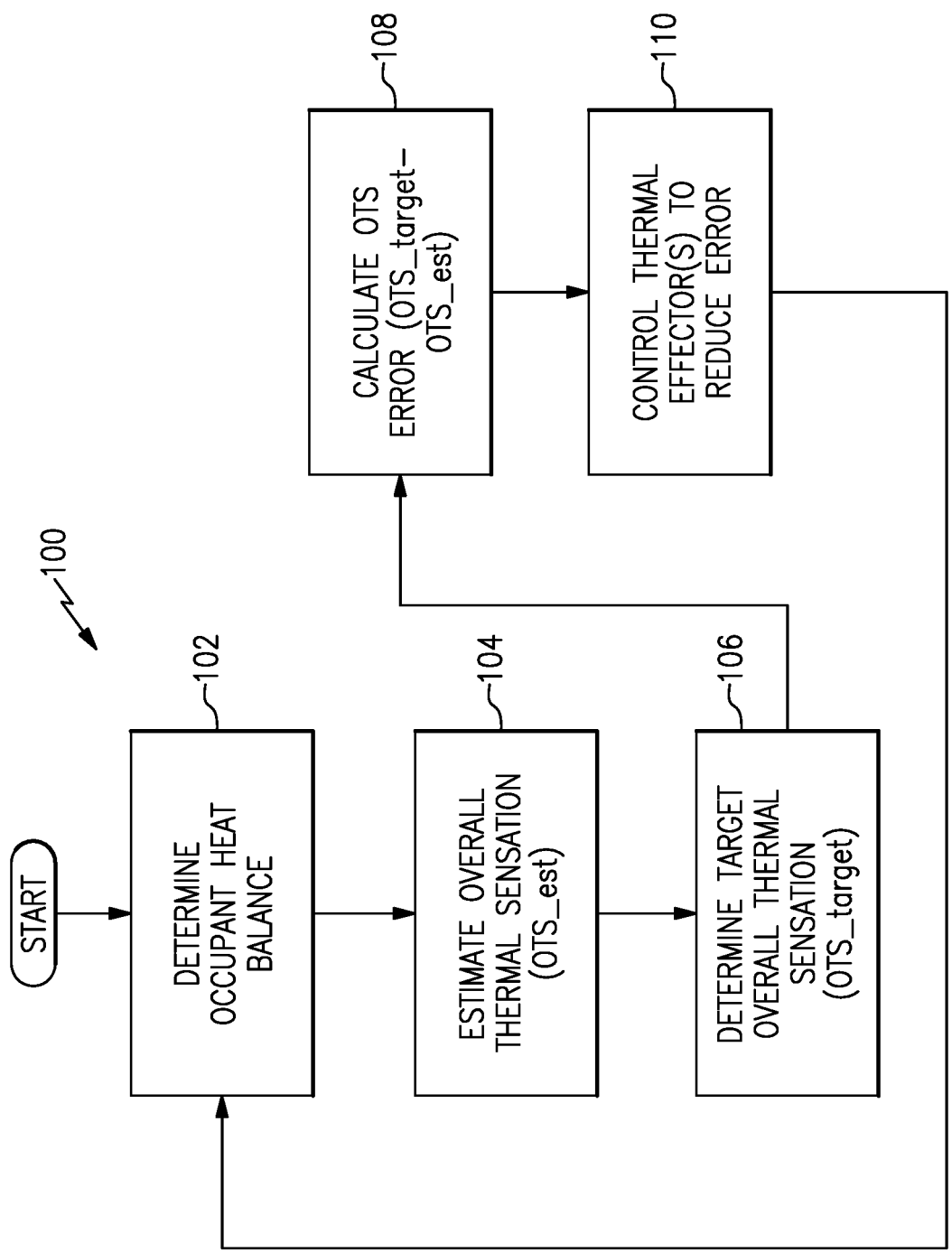
FIG. 2 is a flow chart that depicts an example method for controlling a plurality of microclimate thermal effectors.

FIG. 2 is a flowchart 100 that shows how the controller 44 controls the plurality of microclimate thermal effectors 40. The controller is capable to determine optimal setpoints for devices that are not under the direct control of the microclimate system, e.g. HVAC or other effectors, by including mathematical models of these devices in the same manner as those devices under direct control, e.g., seat heaters etc. Alternatively, the controller may cooperate with other climate control systems by splitting and separately controlling zones within specific power budgets. In any of these scenarios, the controller 44 determines a heat balance for the vehicle occupant 50 in the vehicle cabin 24 (step 102), which represents the total thermal effects on the vehicle occupant 50 as a measure of the vehicle occupant's heat loss, which produces a whole body thermal sensation. In one example, the heat balance is determined as an "equivalent homogeneous temperature," as described in application No. 62/951,289, the disclosure of which is incorporated herein by reference in its entirety.

Having determined the heat balance, the controller 44 estimates an OTS experienced by the vehicle occupant 50 ("OTS_est") (step 104). OTS_est is indicative of an estimated heat flux experienced by the vehicle occupant 50 (e.g., across some or all of the OPZs 42). The controller 44 also determines a target OTS ("OTS_target") for the vehicle occupant 50 (step 106). Similarly, an OTS_target is calculated using an inversion of the same thermophysiology model as the estimate but with nominal conditions of heat transfer rate and occupant profile. The inversion of this heat transfer model allows the user to input a 'set temperature' which the control software is able to convert into an equivalent target OTS. The vehicle occupant profile may be a default profile that assumes or infers details about a weight, gender, and clothing of the vehicle occupant, or may be customized by the vehicle occupant to provide such details. OTS_target is indicative of a desired heat flux for the vehicle occupant 50 (e.g., across some or all of the OPZs 42). The OTS_target is also calculated based on a global temperature setpoint for the vehicle occupant across all of the OPZs 42, which may be provided based on a default temperature value, or based on a specific occupant-provided temperature value.

The controller 44 calculates an error between the two OTS metrics as OTS_target−OTS_est (step 108), which indicates a difference between the two OTS metrics. A positive error indicates that OTS_est is lower than OTS_target, and correspondingly indicates that the vehicle occupant 50 should be heated in some or all of the OPZs 42. Conversely, a negative error indicates that OTS_est is greater than OTS_target, and correspondingly indicates that the vehicle occupant 50 should be cooled in some or all of the OPZs 42. The controller 44 controls the plurality of thermal effectors 40 to reduce the error of step 108 (step 110).

The one example, the OTS is determined using an equation in the form of a sigmoid function with terms related to specific occupant thermal characteristics in combination with the calculated heat loss to the occupant's body, such as the equation below:

$$\text{OTS\_est} = \frac{6}{1 + \exp(-A \times (HeatLoss_{Body} + B))} - 3 \qquad (\text{eq. 1})$$

where $HeatLoss_{Body}$ corresponds to the heat flux of the vehicle occupant across the plurality of OPZs 42, and A and B are coefficients which relate to a number of environmental and occupant factors such as seasonal effects on the heat flux.

In one example, the controlling of step 110 is based on a relative ranking of each thermal effector 40 (e.g., on a scale of 0-1.5) that indicates an order of preference for the effector 40 and/or OPZ 42 for a given occupant. As an example, a given occupant may prefer that thermal conditioning is conducted primarily through effector 40A and could therefore assign a higher ranking to the effector 40A than to other effectors. Conversely, another occupant may wish to deemphasize the effector 40A and instead prefer that thermal conditioning is conducted more significantly through effector 40D. That occupant could assign a higher ranking to effector 40D than to effector 40A. The ranking allows occupants 50 to indicate their desired priority.

In an "AutoComfort" mode the ranking can be multiplied by the OTS error (e.g., using equation 2 below) to determine an OPZ-specific OTS value.

$$OTSerrEffector = OTSerrNormalized * EffectorRanking \quad (eq. 2)$$

In one example, this rank for a thermal effector is increased by a first amount if the vehicle occupant requests a change in the setpoint for that effector (e.g., an increase during heating or a decrease during cooling). If the effector is turned off by the vehicle occupant, then the rank is reduced by a second amount that is larger than the first amount.

In an "AutoOptimal" mode the ranking is multiplied by an effectiveness value with same range to reflect the power delivered/power consumed by each thermal effector. The objective is to 'weight' the correction applied to the setpoint of each device according to preferences only (in AutoComfort) and preferences and effectiveness (in AutoOptimal).

Thus, the controller 44 in one example determines a ranking of each of the thermal effectors 40 and determines a temperature setpoint for each OPZ 42 further based on the relative ranking of each thermal effector 40 in the OPZ 42.

Figure 3:
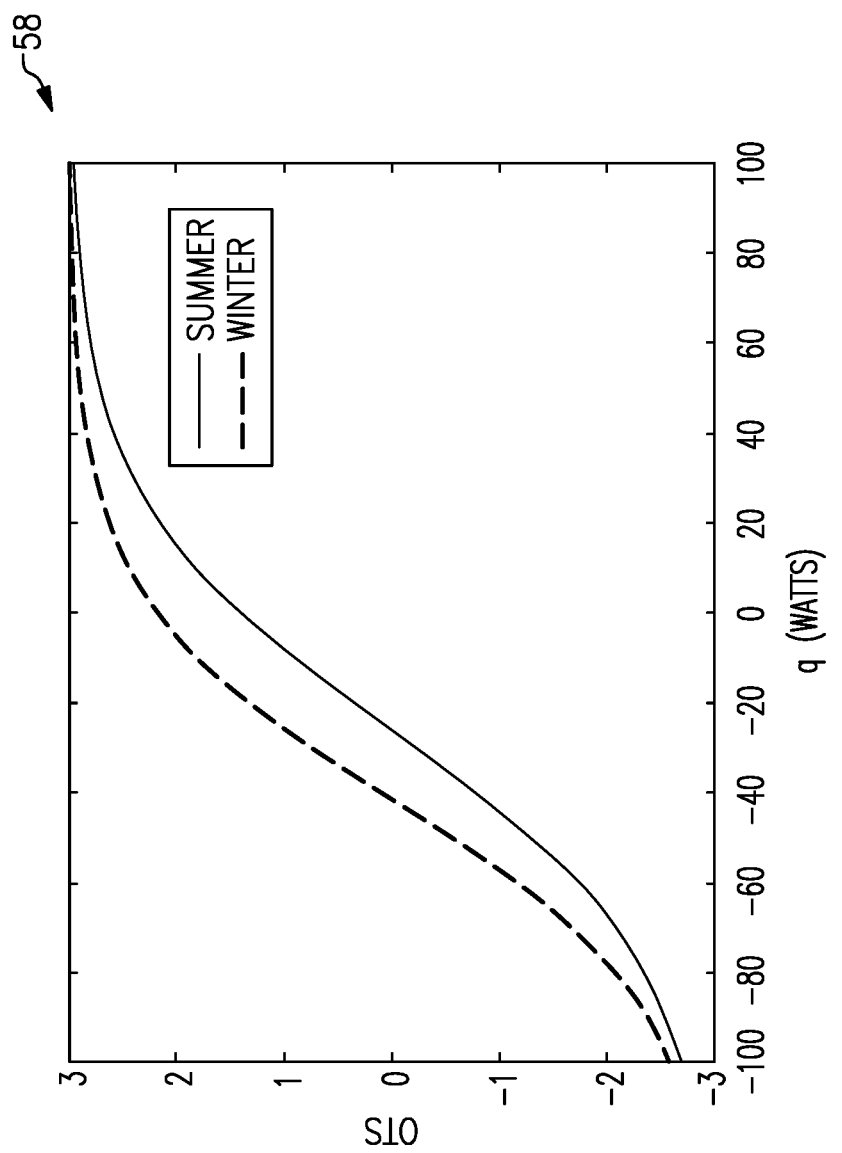
FIG. 3 is a graph depicting an example of how an overall thermal sensation (OTS) experience by a vehicle occupant can vary between seasons.

FIG. 3 is a graph showing how OTS may vary between summer and winter. The Y axis represents OTS, and the X axis represents a heat transfer rate "q" which is measured in Watts (joules per second). As shown in FIG. 3, the vehicle occupant 50 experiences a different OTS at the same heat transfer rate depending on the season, with winter weather generally causing the vehicle occupant 50 to experience a given OTS at a lower heat transfer rate than summer weather.

Figures 4, 4A:
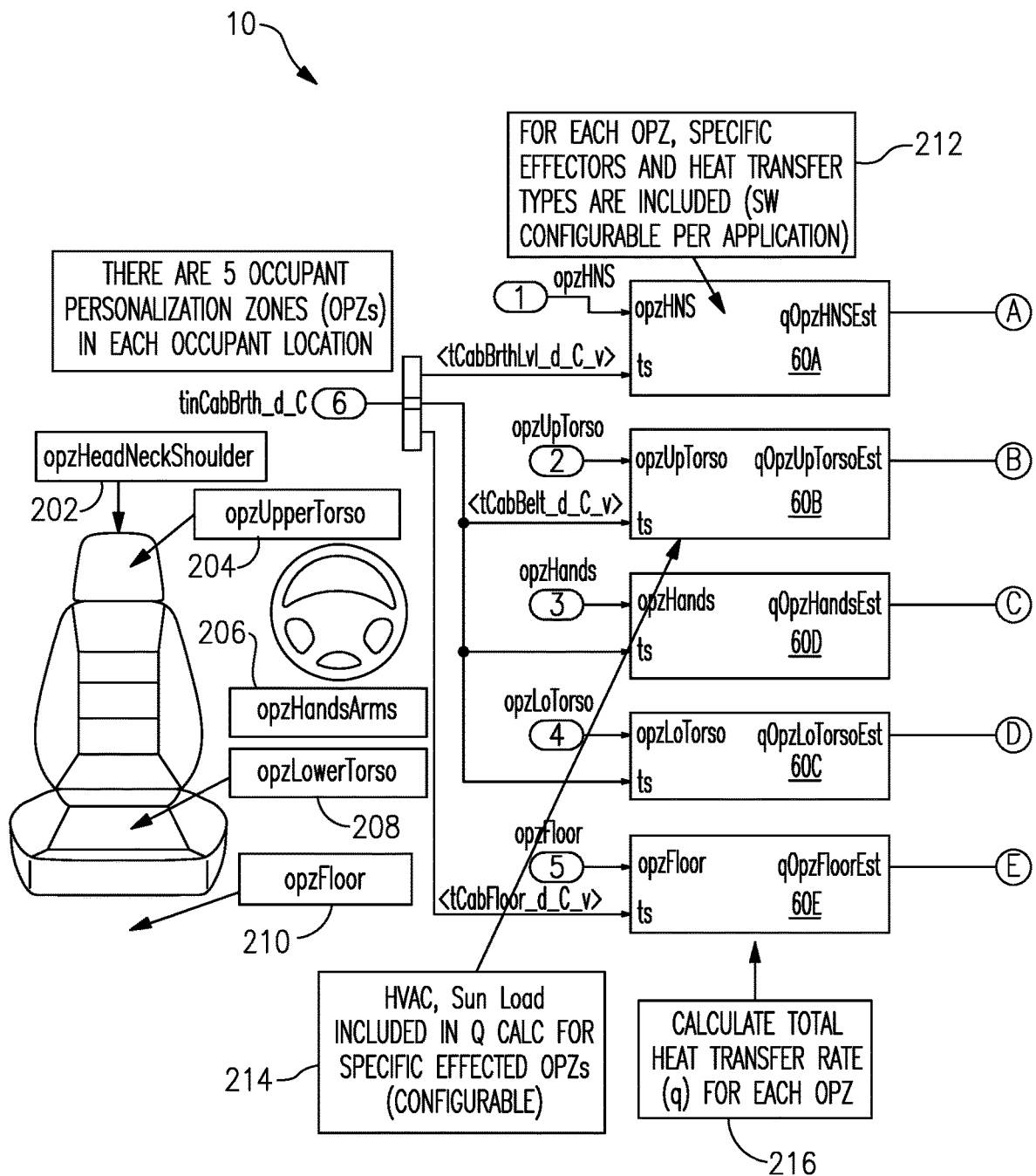
FIG. 4 is a diagram illustrating how
FIGS. 4A, 4B, and 4C are arranged.
Figure 4B:
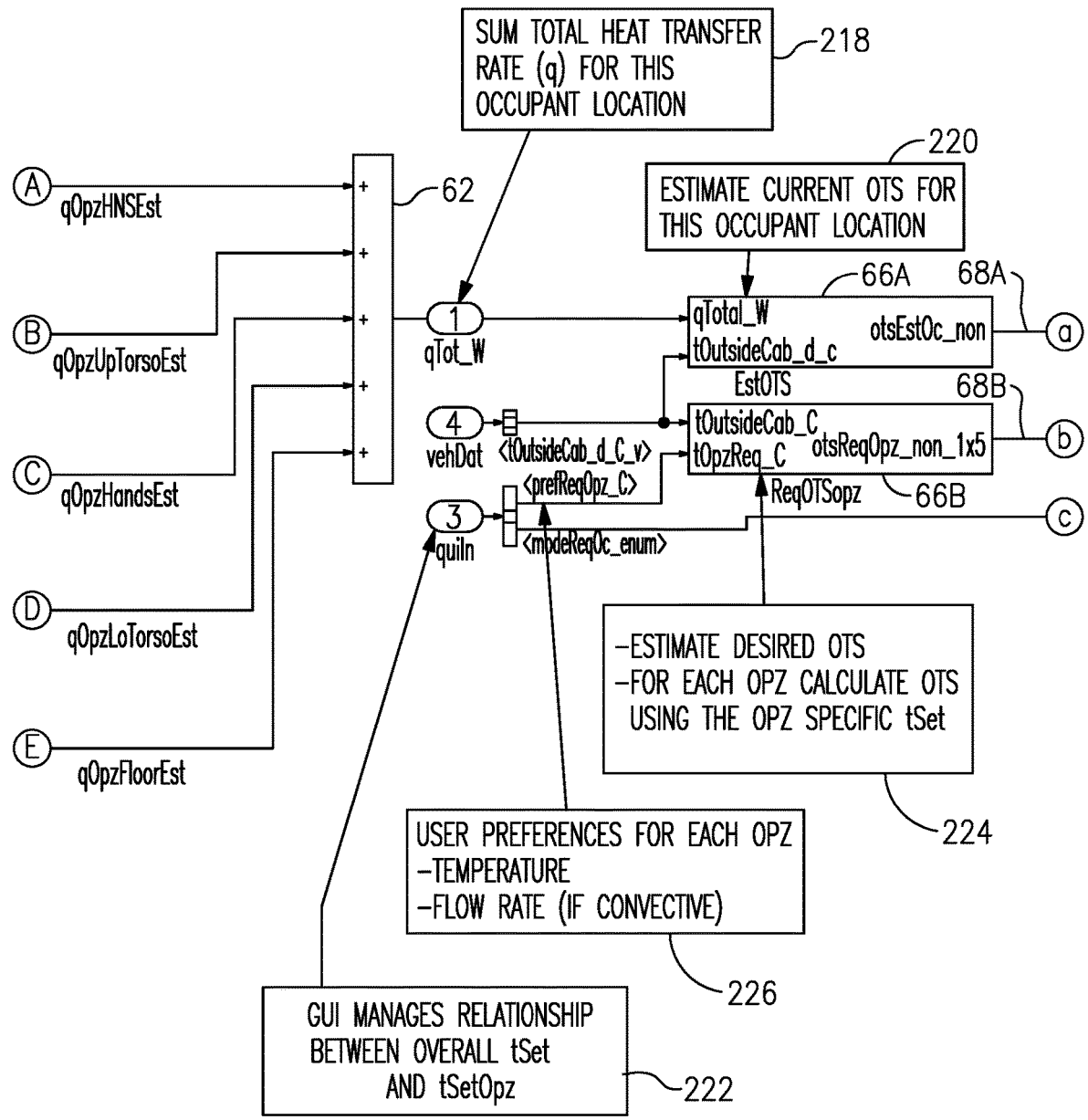
Figure 4C:
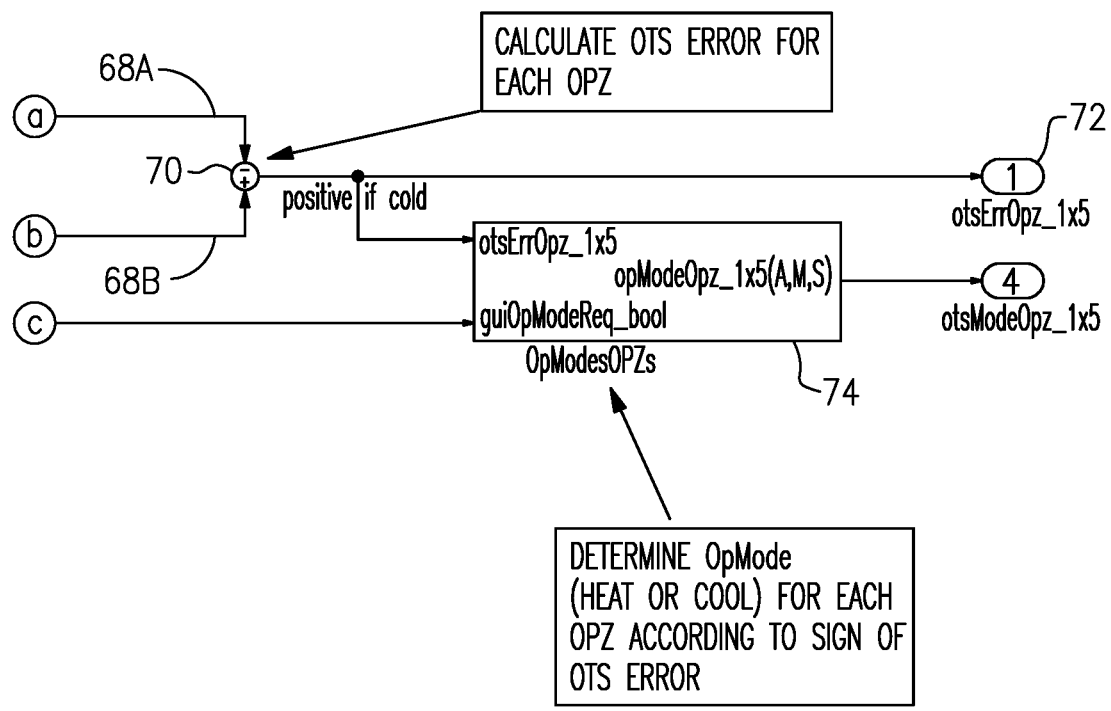

FIG. 4 is a diagram illustrating an example arrangement for determining OTS_est and OTS_target, which includes FIGS. 4A, 4B, and 4C. Referring now to FIGS. 4A, 4B, and 4C, a respective estimator 60A-E for each OPZ 42 calculates a total heat transfer rate (Q) for its respective OPZ 42. Optionally, some of the estimators 60 may account for thermal conditioning from the HVAC system 12 and/or a sun load experienced by the vehicle when the HVAC system 12 and/or sun load have a significant effect on the OPZ 42. In particular, the estimator 60B may benefit from such consideration, since the upper torso of the vehicle occupant 50 is likely to be effected by these factors. The respective estimator 60 output their OPZ-specific heat transfer rates which are summed by a summing device 62 to determine an overall heat transfer rate 64. The summing device 62 combines the heat transfer for each of the OPZs zones to understand the total heat transfer to or from the vehicle occupant 50. This total heat transfer to the vehicle occupant 50 can then be used to calculate other metrics to quantify the vehicle occupant's thermal comfort (ex. OTS, EHT, Predicted Mean Vote (PMV) and Predicted Percentage of Dissatisfied (PPD), etc.) and then to control the system accordingly.

A first OTS calculator 66A takes that total heat transfer from the summing device 62 and calculates OTS_est and provides OTS_est as an output 68A. A second OTS estimator 66B determines an OTS_target for the vehicle occupant 50 and provides OTS_target as an output 68B. The estimator 66A bases its determination on user preferences (e.g., from a graphical user interface) and/or a power budget for the various microclimate thermal effectors 40.

A summing device 70 determines the difference between the OTS_target and OTS_est to determine an OTS error 72 which the controller 44 uses to determine setpoints for the various thermal effectors 40. An OTS mode module 74 determines whether each thermal effector 40 will provide heating or cooling based on the OTS error 72, and further based on any occupant-provided temperature offsets (e.g., OPZ-specific temperature offsets). The offsets will be discussed in greater detail below.

Figure 5:
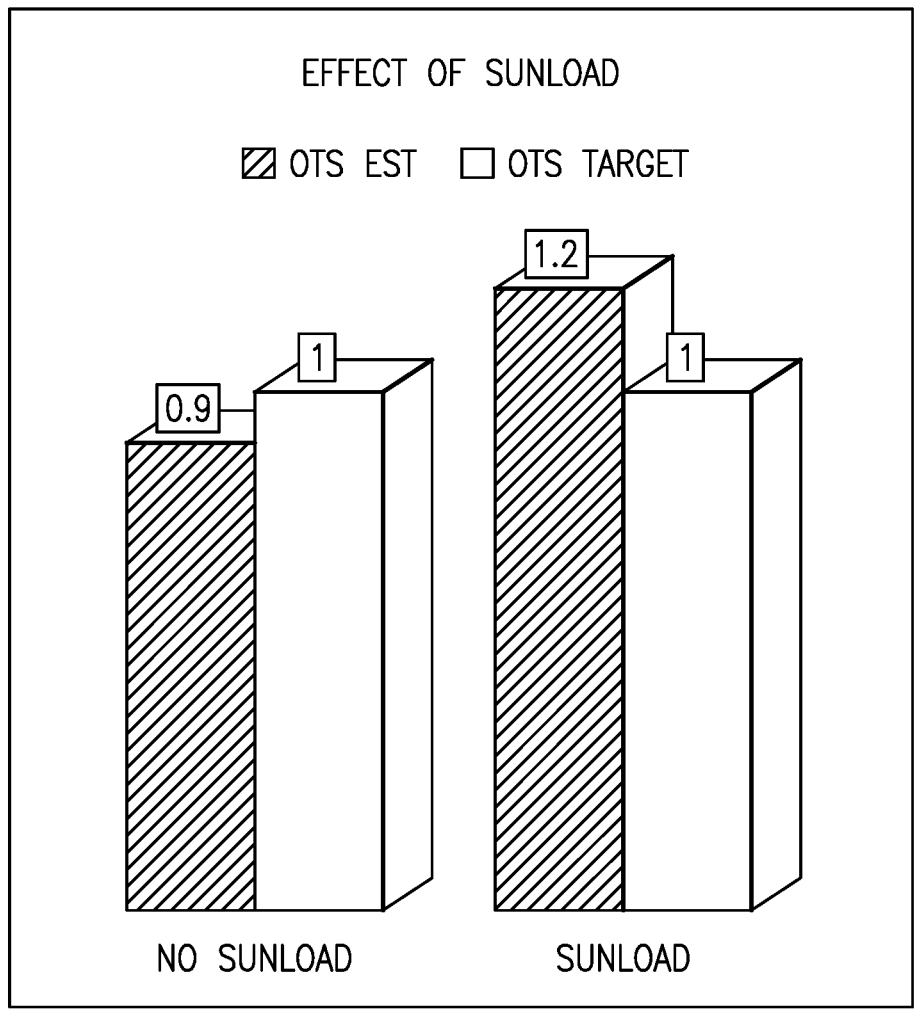
FIG. 5 is a diagram illustrating an example effect that sun load can have on OTS.

FIG. 5 is a diagram illustrating an example effect that sun load can have on the OTS. As shown in the example of FIG. 5, when there is no sun load for a particular exterior temperature, OTS_est is less than OTS_target, but when there is a sun load, OTS_est may be greater than OTS_target. Thus, sun load may cause the vehicle occupant 50 to feel warmer, and therefore less thermally comfortable than they would otherwise feel absent the sun load. The effect of sun load on OTS_est is an example of how the control software uses a thermophysiology-based model to control the microclimate around each occupant by compensating for thermal disturbances.

Figure 6:
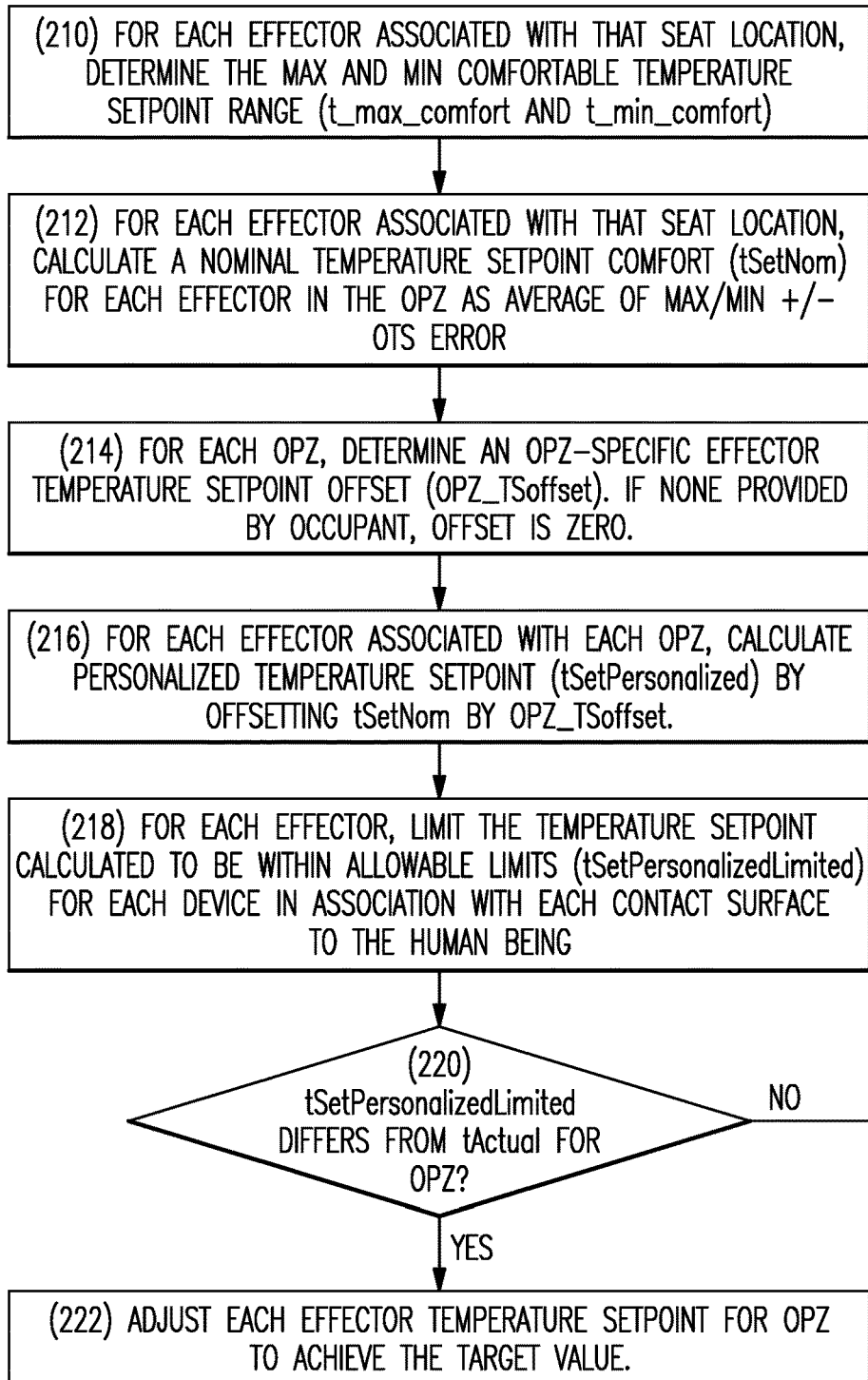
FIG. 6 depicts a flow chart of a method for adjusting thermal effector setpoint temperatures based on OTS.

FIG. 6 illustrates a flowchart 200 of example implementation of step 110 of FIG. 2. The controller 44 is configured to perform the various steps of the flowchart 200 in one example. For each thermal effector 40 associated with a given seat location of the vehicle occupant 50, the controller 44 determines a thermal conditioning range that includes the maximum and minimum comfortable temperature {t_max_comfort, t_min_comfort} and, if applicable, flow rate setpoint range {v_min_comfort, v_max_comfort} (step 210). The predefined thermal conditioning ranges may differ between OPZs 42 and between the thermal effectors 40 in each OPZ 42.

The maximum and minimum are determined based on the thermal physiology model and/or empirical data indicating typically desired thermal conditioning temperatures for a given body area. For example, the vehicle occupant 50 may find it more comfortable to have their head and feet warmer than their back and upper legs. Note that this control mechanism can apply to any thermal effector in the vehicle including HVAC or other auxiliary heating and cooling devices. In this way, the control software is able to coordinate a network of devices which may be different in different applications but which may be handled in the same control scheme.

Having determined the maximum and the minimum comfortable temperature setpoint range in step 210, the controller 44 determines a nominal temperature setpoint (tSetNom) for each thermal effector 40 in the OPZ (step 212). The nominal temperature setpoint for an OPZ may be used as a default temperature for the OPZ, for example. In the example of FIG. 6, this includes determining an average of the maximum and minimum comfortable temperature setpoint range for the OW plus or minus the OTS error of step 208.

Figure 7:
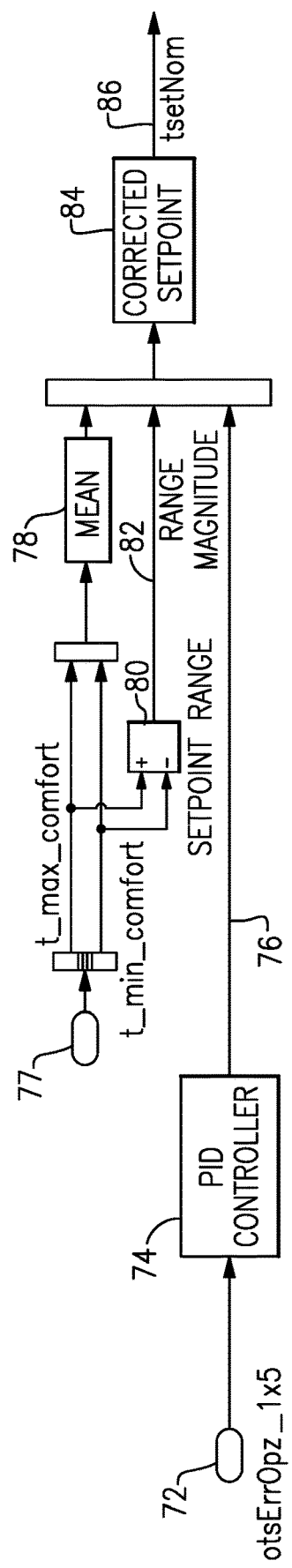
FIG. 7 is a diagram illustrating an example arrangement for determining a corrected temperature setpoint.

FIG. 7 is a diagram illustrating an example arrangement for determining a corrected temperature setpoint based on the OTS error 72 shown in FIG. 4C. The diagram in FIG. 7 can be used to perform step 212 in FIG. 6, for example. The OTS error 72 is provided to a proportional-integral-derivative (PID) controller 74 which is configured to analyze the OTS error 72, and provide an OTS error output 76 that is based on a proportional term, integral term, and derivative term, using known PID control techniques. Each of these terms is unique to each effector, in one example. The integral term (not shown in FIG. 7, and which is characterized by an accumulation of the OTS error 72), and the derivative term (not shown in FIG. 7, and which is characterized by a rate of change of OTS error 72 over time). The example discussed below assumes that the integral and derivative terms are 0, but it is understood that non-zero values could be used for those terms using known PID control techniques.

A thermal conditioning range 77 that includes a maximum temperature (t_max_comfort) and a minimum temperature (t_min_comfort) is provided. As an example, assume that the t_max_comfort for a particular OPZ 42 is 10° C. and that t_min_comfort for the particular OPZ 42 is 0° C. Block 78 determines a mean of the values (5° C. in this example), and block 80 determines a magnitude 82 of the range (10° C. in this example). Block 84 determines a corrected setpoint (tsetNom) 86 based on these inputs. In one example, block 84 uses equation 3 below.

$$tsetNom = u(1) + \frac{u(2) * u(3)}{100} \quad \text{(eq. 3)}$$

where u(1) represents the nominal setpoint;
u(2) represents the range magnitude; and
u(3) represents the OTS error output 76.

Using the example values discussed above, u(1) would equal 5° C. and u(2) would equal 10° C. For the sake of discussion, assume that the OTS error output 76 corresponding to u(3) is a 20% error (indicating that OTS_target is 20% higher than OTS_est). Using these values, tsetNom would equal (5+(10*20)/(100), or 7° C.

Referring again to FIG. 6, the controller 44 determines whether the vehicle occupant 50 has provided a temperature setpoint offset (OPZ_TSoffset) for any of the OPZs 42 through a user interface (step 214). If no offset is provided, the OPZ_TSoffset for that OPZ is zero. For each thermal effector 40 associated with each OPZ 42 that has a non-zero OPZ_TSoffset, the controller 44 calculates a personalized temperature setpoint (tSetPersonalized) by offsetting the nominal temperature setpoint (e.g., default temperature setpoint) by the offset (step 216). If there is no offset for a particular OPZ 42, then tSetPersonalized is the same as tSetNom.

If the vehicle occupant 50 has an offset of +1° C., then using the example tsetNom above, sSetPersonalized could be calculated as 7+1=8° C. Conversely, if the vehicle occupant 50 has an offset of −1° C., then tSetPersonalized could be calculated as 7−1=6° C. In this example, the default temperature of 5° C. is the mean of the maximum and minimum temperatures, and the default temperature is adjusted based on the difference between the OTS_target and OTS_est to obtain the target temperature 8° C. or 6° C.

For each thermal effector 40, the controller 44 compares the personalized temperature setpoint (tSetPersonlized) to a permitted thermal conditioning range for the OPZ (step 218). This may correspond to an OEM specific thermal conditioning range for the OPZ that may differ from the maximum and minimum comfort levels determined in step 210. For example, an OEM may not wish to provide for the full range of thermal conditioning that is possible for a given thermal effector 40 and/or OPZ 42. If the personalized temperature setpoint exceeds the allowable limits (i.e. is greater than the maximum temperature or lower than the minimum temperature), the personalized temperature setpoint is adjusted accordingly as tSetPersonalizedLimited (step 218) (e.g., by being reduced). If tSetPersonalized is within the permitted thermal conditioning range for the OPZ, tSetPersonalizedLimited is the same as tSetPersonalized for the OPZ 42.

The controller 44 compares tSetPersonalizedLimited to the actual temperature for the given OPZ 42 (tActual) (step 220), and if they differ adjusts the output temperature of each thermal effector in the OPZ 42 to reduce the difference between tActual and tSetPersonalizedLimited and/or achieve the target value (step 222). As discussed above, tActual could be direct measurement from within the OPZ or could be inferred from a temperature outside the OPZ 42.

In one example, step 222 is performed based on a gain schedule which indicates how aggressively thermal setpoints should be targeted. For example, when an occupant first enters the vehicle cabin 24 from a relatively cold temperature, they may wish to have higher hand and/or neck warming temperatures than they would after being in the vehicle for 20 minutes. Also, the adjustments of step 222 could further be based on OEM specific indications of how aggressively thermal setpoints should be pursued. For example, a given OEM may want to approach a thermal setpoint more aggressively, whereas another OEM may wish to pursue the thermal setpoint more conservatively (e.g., to avoid overshooting the thermal setpoint).

By utilizing OPZ_TSoffset as feedback from the vehicle occupant 50, the thermal conditioning system 10 acts as a closed loop system. In one example, although the vehicle occupant 50 is able to personalize the thermal effect in a particular zone (OPZ), the controller 44 still maintains the overall OTS because it measures/calculates the overall heat transfer to the body. This allows individual preferences for each zone and device to be set while maintaining the correct OTS using the combination of all devices in an arrangement that is preferred by the vehicle occupant 50. Over time, these preferences may be learned, while still permitting the vehicle occupant 50 to adjust the overall OTS using the OTSset input to the thermal conditioning system 10.

In one example, the method of FIG. 6 can be performed to simultaneously heat and cool the vehicle occupant 50 by heating the vehicle occupant 50 with a first thermal effector 40 in a first one of the OPZs (e.g., thermal effector 40A in OPZ 42A) based on the target temperature for the first OPZ being below the determined temperature of the first OPZ, and cooling the vehicle occupant 50 with a second thermal effector 40 in a second one of the OPZs (e.g., thermal effector 40E in OPZ 42E) based on the target temperature for the second OPZ being above the determined temperature of the second OPZ.

Figure 8:
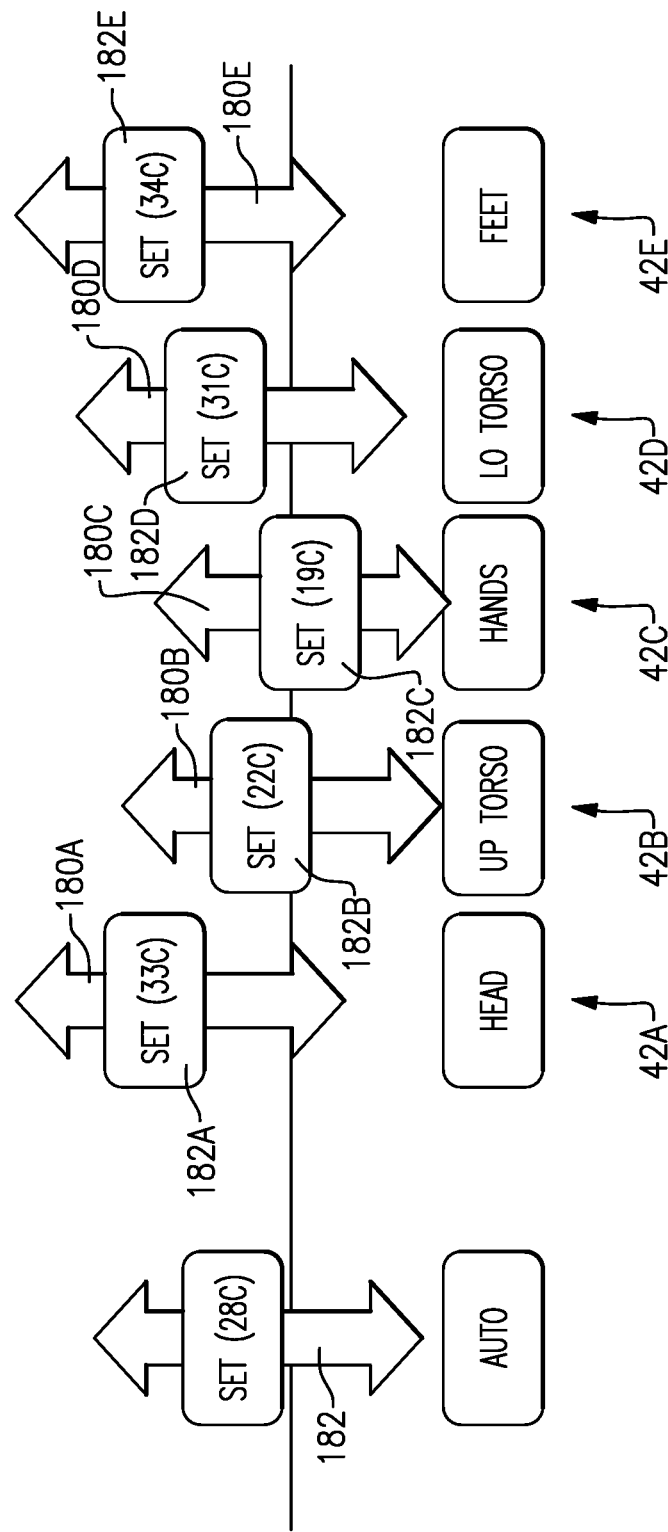
FIG. 8 illustrates a plurality of thermal conditioning ranges for thermal effectors.

FIG. 8 illustrates an example of the maximum and minimum comfortable thermal conditioning range of step 210. As shown in FIG. 8 each OPZ 42A-E has an associated thermal conditioning range 180A-E, and different ones of the OPZs have different thermal conditioning ranges. For example, the max and min temperatures of the head thermal conditioning range 180A for OPZ is greater than those of the upper torso and hand thermal conditioning ranges 180B, 180C, indicating that the vehicle occupant 50 is believed to generally prefer a higher temperature in the OPZ 42A than the OPZs 42B and 42C. A global thermal conditioning range 182 is also provided, from which the global temperature setpoint discussed above may be determined. This may be used in an "auto" mode whereby the vehicle occupant 50 does not wish to specifically provide for granular control of each OPZ 42, but rather wishes for the controller 44 to automatically control each OPZ 42 based on the global temperature setpoint.

Figure 9:
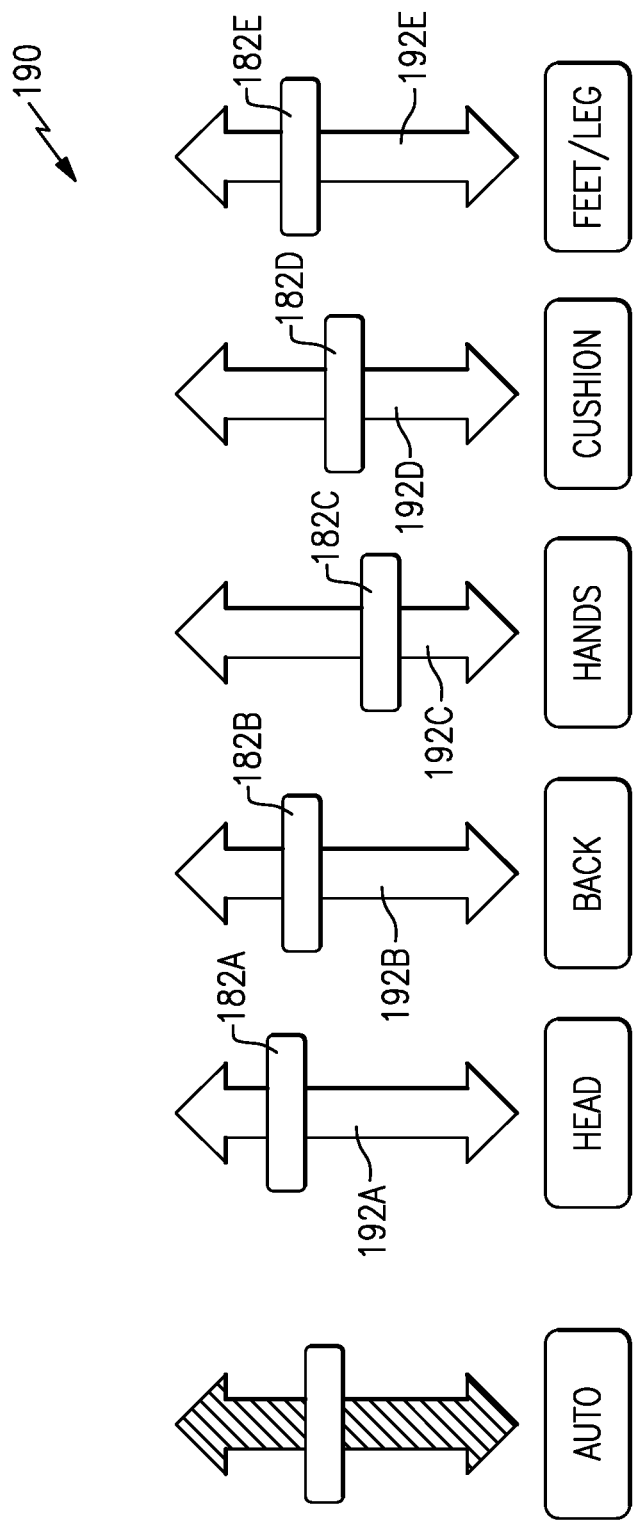
FIG. 9 illustrates an example graphical user interface for customizing temperature setpoints for a particular occupant personalization zone.

FIG. 9 illustrates an example graphical user interface (GUI) 90 to provide for customization of thermal temperature setpoints in each OPZ 42. The GUI 190 obscures that the exact temperature of each thermal conditioning setpoint 182A-E from the vehicle occupant 50, and instead provides a graphical depiction of the setpoints 182 within a graphical depiction 192A-E of each range. The ranges 192A of the GUI 190 are normalized to appear each to have the same upper and lower bounds, when in fact the ranges may differ as shown in FIG. 8. By increasing a particular one of the thermal conditioning setpoints 182A-E, the vehicle occupant 50 is able to introduce the temperature offset of step 214, and thereby personalize how the controller 44 provides thermal conditioning in each OPZ 42.

The vehicle occupant 50 may choose to disable all thermal effectors 40 for a given OPZ 42 by providing a disable command through the GUI 190. Based on this disable command, the controller 44 would disable the thermal effectors 40 for the OPZ 42. In one example, the controller 44 also resets any user occupant offset for a given OPZ 42 based on receiving the disable command for the OPZ 42. In one example, the controller 44 adapts to the preferences of the user by ranking each thermal effector 40, as discussed above. This could include reducing the ranking of a given effector if the effector 40 is turned off.

In one example, the controller 44 resets the offset for a given effector if the controller 44 determines that the offset was made in error (e.g., the system was faulty when the offset was determined). In one example, if a user introduces a same offset in every OPZ 42, the controller 44 treats this as a request to change a global temperature setpoint for the vehicle cabin 24 and resets all of the offsets to zero.

Although not shown in FIG. 9, it is understood that fan speed customization could also be provided through the same or another GUI 190 for a microclimate thermal effector that utilizes a fan. The fan speed offset in one example is used to offset a default fan speed determined by the controller 44 as part of step 222 in FIG. 6. If the difference between tActual and tSetPersonalizedLimited is greater than a first threshold, the default fan speed may be higher, and if the difference is less than the threshold (indicating tActual is closer to tSetPersonalized) the default fan speed could be lower. The fan speed offset could be provided to let the vehicle occupant 50 customize the fan speed to their liking.

Vehicle occupant 50 preferences (e.g., +/−delta temperatures provided as OPZ_TSoffset) may be interpreted as a reduction or increase in thermal conditioning. However if they are large enough (e.g., they exceed a predefined temperature threshold), in one example the controller 44 of the thermal conditioning system 50 will interpret these preferences as a desire to switch from heat to cool or vice versa for a particular OPZ that has both heating and cooling capabilities. Because the thermal conditioning system 10 is a closed loop system, the overall OTS can still be maintained. The decision to switch from heat to cool and vice versa is based on a comparison of the preference (OPZ delta temperature) with the tSet for that particular zone (e.g., tSetNom and/or tSetPersonalized).

Figure 10:
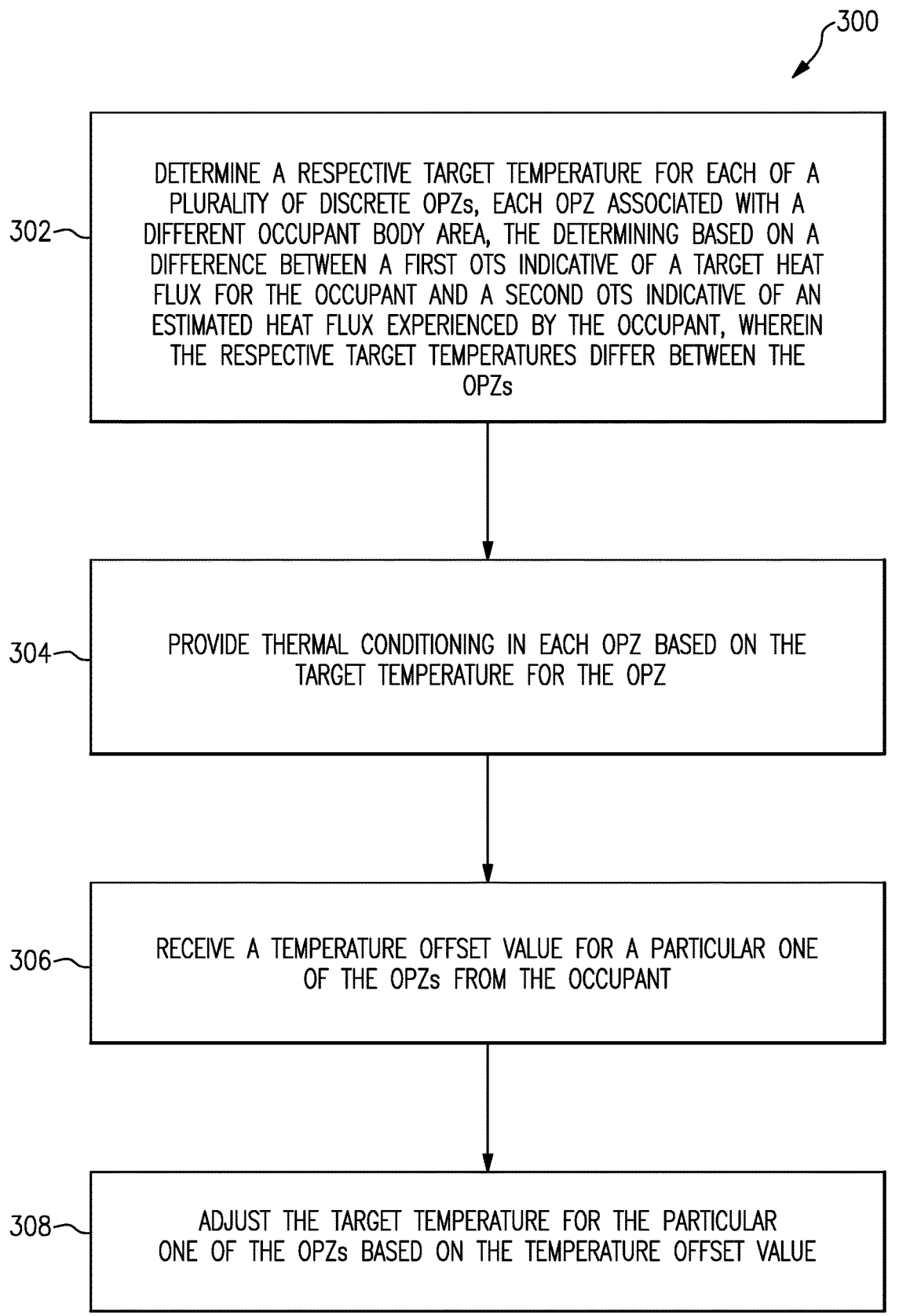
FIG. 10 is a flowchart that depicts an example method of providing thermal conditioning for an occupant of a vehicle.

FIG. 10 is a flowchart 300 that depicts an example method of providing thermal conditioning for a vehicle occupant 50. The controller 44 is configured to perform the various steps in the flowchart 300 in one example. Referring to FIG. 10, a determination is made (step 302) of a respective target temperature for each of a plurality of discrete OPZs 42, with each OPZ 42 being associated with a different occupant body area. The determining of step 302 is based on a difference between a first OTS indicative of a target heat flux for the vehicle occupant 50 and a second OTS indicative of an estimated heat flux experienced by the vehicle occupant 50, wherein the respective target temperatures differ between the OPZs 42. An example of step 302 is shown as steps 210-218 in FIG. 6.

Thermal conditioning is provided in each OPZ 42 based on the target temperature for the OPZ 42 (step 304). The providing of thermal conditioning in step 304 includes utilizing at least one thermal effector 40 in the OPZ 42.

A temperature offset value is received for a particular one of the OPZs 42 from the vehicle occupant 50 (step 306). An example of step 306 is shown as step 214 in FIG. 6. The temperature offset may be received using the GUI 190 of FIG. 9, for example. The target temperature for the particular one of the OPZs 42 is adjusted based on the temperature offset value (step 308). The determining of step 302, providing of step 304, and adjusting of step 308 may be iteratively repeated for a plurality of iterations while unitizing the same temperature offset during each of the plurality of iterations, for example.

Although a single vehicle occupant 50 is discussed above, it is understood that the method 100 could be performed for a plurality of additional vehicle occupants (e.g., front passenger, one or more rear passengers, etc.). Each occupant has their own OPZs that could be separately controlled based on one or more of the following: the profile for the additional occupants, the location of the additional occupants in the vehicle (e.g., as a rear passenger may be less likely to experience sun load), the particular thermal effectors available to the additional occupants, and the thermal offsets introduced by the additional occupants for their respective OPZs.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of providing thermal conditioning for an occupant of a vehicle, comprising:
   determining a respective target temperature for each of a plurality of discrete occupant personalization zones (OPZs), each OPZ associated with a different occupant body area, said determining based on a difference between a first overall thermal sensation (OTS) indicative of a target heat flux for the occupant and a second OTS indicative of an estimated heat flux experienced by the occupant, wherein the respective target temperatures differ between the OPZs, and wherein said determining includes determining a plurality of discrete OTS values, each corresponding to an estimated heat flux in a respective one of the plurality of OPZs, and calculating the second OTS based on the plurality of discrete OTS values;
   providing thermal conditioning in each OPZ based on the target temperature for the OPZ, the providing including utilizing at least one thermal effector in the OPZ;
   receiving a temperature offset value for a particular plurality of respective ones of the OPZs from the occupant;
   adjusting the target temperature for the plurality of respective ones of the OPZs based on the respective temperature offset values; and
   for a particular one of the OPZs:
      comparing the adjusted target temperature to at least one of a maximum permissible target temperature for the OPZ and a minimum permissible target temperature for the OPZ; and
      reducing the temperature offset for the OPZ based on the adjusted target temperature for the OPZ exceeding the maximum permissible target temperature for the OPZ or falling below the minimum permissible target temperature for the OPZ.

2. The method of claim 1, comprising:
receiving a disable command from the occupant for one or more of the OPZs; and
based on said receiving the disable command:
disabling said one or more of the OPZs based on the disable command; or
resetting the temperature offset for the particular one of the OPZs based on the disable command.

3. The method of claim 1, comprising:
determining a temperature in each OPZ;
wherein for each OPZ, said providing thermal conditioning in the OPZ comprises adjusting an output of the at least one thermal effector in the OPZ to reduce a difference between the determined temperature and the target temperature for the OPZ.

4. The method of claim 3, wherein said providing thermal conditioning in each OPZ comprises:
heating the occupant with a first thermal effector in a first one of the OPZs based on the target temperature for the first OPZ being below the determined temperature of the first OPZ; and
cooling the occupant with a second thermal effector in a second one of the OPZs based on the target temperature for the second OPZ being above the determined temperature of the second OPZ;
wherein said heating and cooling are performed simultaneously.

5. The method of claim 3, wherein said providing thermal conditioning in each OPZ comprises:
determining a ranking of each of the thermal effectors; and
determining a temperature setpoint for each OPZ further based on the relative ranking of each thermal effector in the OPZ.

6. The method of claim 1, wherein said determining a respective target temperature for each OPZ comprises:
determining at least one predefined thermal conditioning range for each effector in each OPZ that includes a maximum temperature and a minimum temperature;
determining a default temperature for the OPZ that is within the predefined thermal conditioning range based on the maximum and minimum temperatures; and
adjusting the default temperature based on the difference between the first OTS and second OTS to obtain the target temperature.

7. The method of claim 6, wherein the at least one predefined thermal conditioning range also includes a maximum airflow rate and a minimum airflow rate.

8. The method of claim 6, wherein the predefined thermal conditioning ranges differ between the OPZs and the thermal effectors in each OPZ.

9. The method of claim 6, wherein said adjusting the default temperature based on the difference between the first and second OTS to obtain the target temperature comprises:
determining a nominal temperature setpoint based on the difference between the first OTS and second OTS, default temperature, and a magnitude of the predefined thermal conditioning range;
increasing the default temperature by a value derived from the nominal temperature setpoint based on the first OTS being greater than the second OTS; and
decreasing the default temperature by the value derived from the nominal temperature setpoint based on the first OTS being less than the second OTS.

10. The method of claim 1, wherein the plurality of OPZs include at least three of a head zone, a seat back zone, a seat cushion zone, a hand/arm zone, and a foot/leg zone.

11. The method of claim 1, wherein the thermal effectors for the plurality of OPZs include at least three of a climate controlled seat, a neck conditioner mounted in a head rest or upper seat back, a climate controlled headliner, a heated steering wheel, a heated gear shifter, a heated door panel, a heater mat, a convective thermal effector capable of heating or cooling located in the seat back or cushion, and a mini-compressor system.

12. The method of claim 11, wherein at least one of the thermal effectors is a convective thermal effector that includes a fan, the method comprising:
determining a default fan speed for the fan; and
adjusting the default fan speed based on receiving a fan speed offset from the occupant.

13. The method of claim 1, comprising:
determining a heat balance for the occupant; and
determining the first OTS based on the heat balance.

14. The method of claim 1, comprising iteratively repeating said determining, providing, and adjusting for a plurality of iterations while utilizing the same temperature offset value during each of the plurality of iterations.

15. The method of claim 1, wherein said determining a plurality of discrete OTS values, each corresponding to an estimated heat flux in a respective one of the plurality of OPZs utilizes OPZs utilizes a coefficient relating to an environmental impact of a seasonal effect on heat flux.

16. A thermal conditioning system comprising:
a plurality of thermal effectors arranged into a plurality of discrete occupant personalization zones (OPZs) that are each associated with a different part of an occupant body area, such that each OPZ includes at least one of the thermal effectors; and
a controller including circuitry configured to:
determine a respective target temperature for each OPZ based on a difference between a first overall thermal sensation (OTS) indicative of a target heat flux for the occupant and a second OTS indicative of an estimated heat flux currently experienced by the occupant, wherein the respective target temperatures differ between the OPZs, and wherein the determination includes determination of a plurality of discrete OTS values, each corresponding to an estimated heat flux in a respective one of the plurality of OPZs, and calculation of the second OTS based on the plurality of discrete OTS values;
control at least one thermal effector in each OPZ based on the target temperature for the OPZ;
receive a respective temperature offset value for multiple respective ones of the OPZs from the occupant;
adjust the target temperature for the multiple respective ones of the OPZs based on the respective temperature offset values; and
for a particular one of the OPZs:
compare the adjusted target temperature to at least one of a maximum permissible target temperature for the OPZ and a minimum permissible target temperature for the OPZ; and
reduce the temperature offset for the OPZ based on the adjusted target temperature for the OPZ exceeding the maximum permissible target temperature for the OPZ or falling below the minimum permissible target temperature for the OPZ.

17. The thermal conditioning system of claim 16, wherein the controller is configured to:
reset the temperature offset for the particular one of the OPZs based on the occupant disabling the at least one thermal effector in the particular one of the OPZs.

18. The thermal conditioning system of claim 16, wherein to determine the respective target temperature for each OPZ, the controller is configured to:
- determine a predefined thermal conditioning range for the OPZ that includes a maximum temperature and a minimum temperature, wherein the predefined thermal conditioning ranges differ between the OPZs;
- determine a default temperature for the OPZ that is within the predefined thermal conditioning range based on the maximum and minimum temperatures; and
- adjust the default temperature based on the difference between the first OTS and second OTS to obtain the target temperature.

19. The thermal conditioning system of claim 18, wherein to adjust the default temperature based on the difference between the first and second OTS to obtain the target temperature, the controller is configured to:
- determine a nominal temperature setpoint based on the difference between the first OTS and second OTS, default temperature, and a magnitude of the predefined thermal conditioning range;
- increase the default temperature by a value derived from the nominal temperature setpoint based on first OTS being greater than the second OTS; and
- decrease the default temperature by the value derived from the nominal temperature setpoint based on the first OTS being less than the second OTS.

20. The thermal conditioning system of claim 16:
- wherein the controller is configured to determine a temperature in each OPZ; and
- wherein to control the at least one thermal effector in each OPZ based on the target temperature for the OPZ, the controller is configured to adjust an output of the at least one thermal effector in the OPZ to reduce a difference between the determined temperature and the target temperature for the OPZ.

21. The thermal conditioning system of claim 16, wherein the determination of the plurality of respective OTS values, each corresponding to an estimated heat flux in a respective one of the plurality of OPZs, utilizes a coefficient relating to an environmental impact of a seasonal effect on heat flux.

* * * * *